July 10, 1962

C. E. MARION ET AL 3,043,386

PORTABLE SCALE PLATFORM STRUCTURE

Filed Nov. 9, 1959

INVENTORS
CLYDE E. MARION
RICHARD T. BARTLETT
GEORGE C. CLARK

BY George A. Woodruff

ATTORNEY

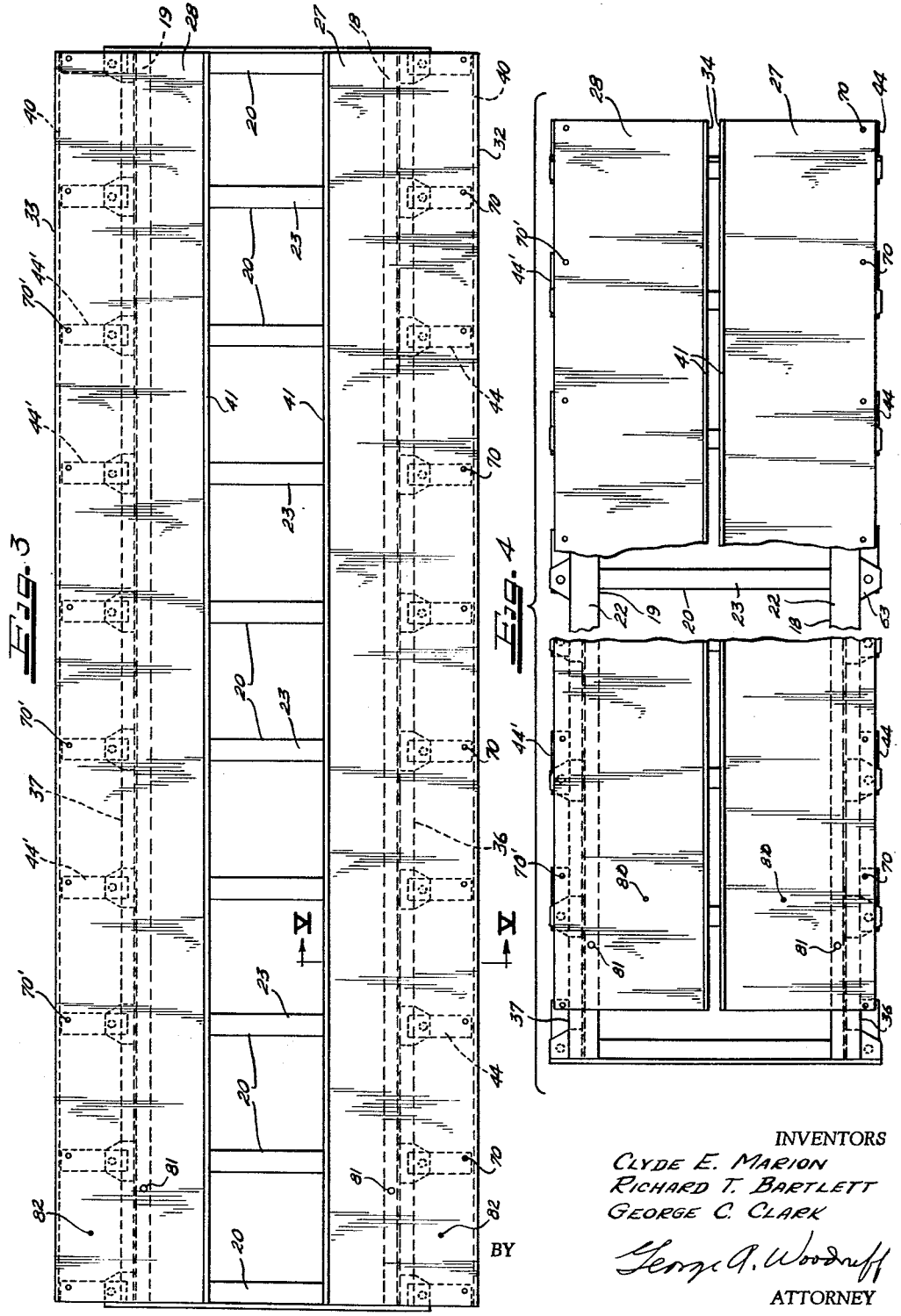

July 10, 1962   C. E. MARION ET AL   3,043,386
PORTABLE SCALE PLATFORM STRUCTURE
Filed Nov. 9, 1959   3 Sheets-Sheet 3
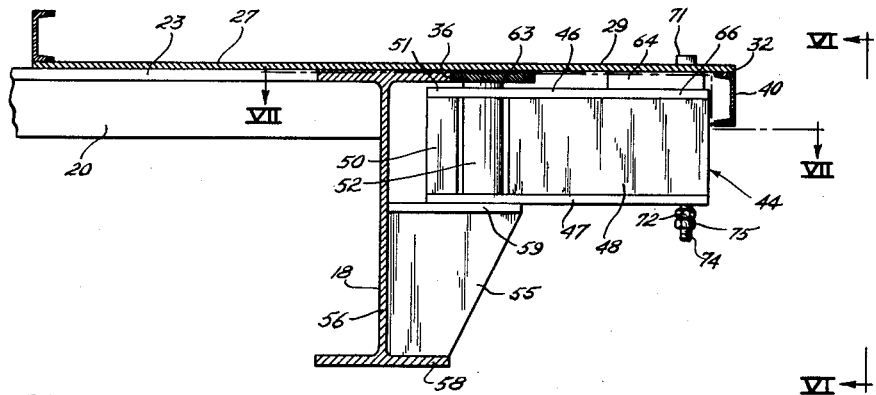
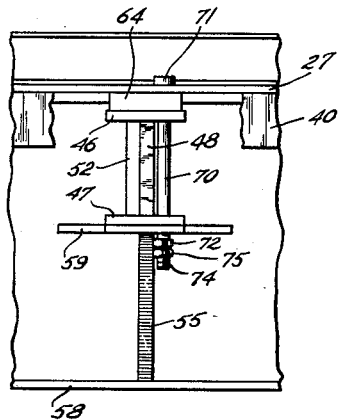
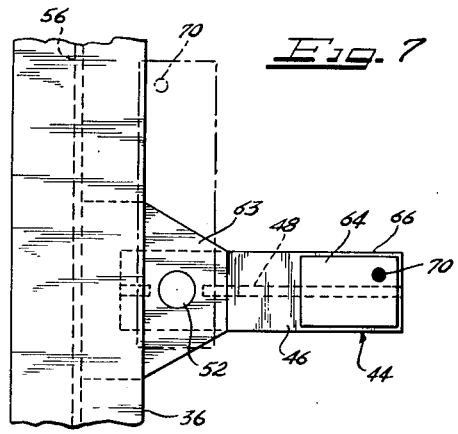
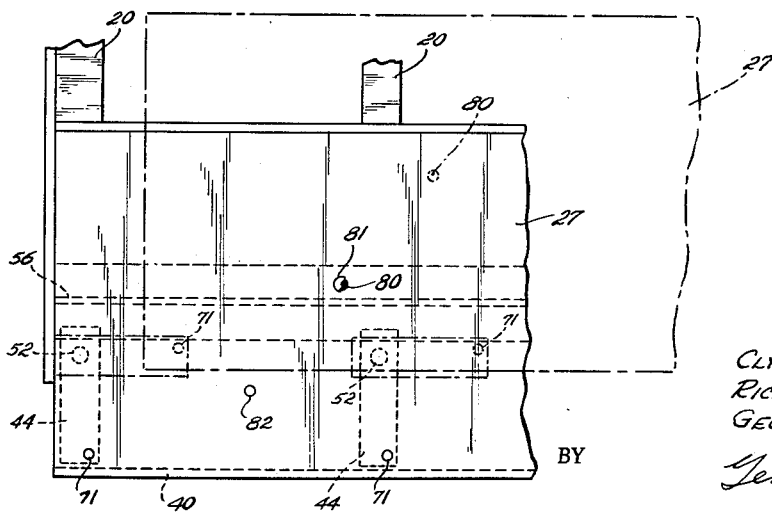
INVENTORS
CLYDE E. MARION
RICHARD T. BARTLETT
GEORGE C. CLARK
BY George A. Woodruff
ATTORNEY United States Patent Office 3,043,386
Patented July 10, 1962

3,043,386
PORTABLE SCALE PLATFORM STRUCTURE
Clyde E. Marion, Oakland, Richard T. Bartlett, Castro Valley, and George C. Clark, Oakland, Calif., assignors to Fairbanks, Morse & Co., Chicago, Ill., a corporation of Illinois
Filed Nov. 9, 1959, Ser. No. 851,635
1 Claim. (Cl. 177—126)

This invention relates to improvements in weighing apparatus, and is concerned more particularly with improvements in weighing apparatus or scales of transportable character, for weighing motor trucks and the like.

It is well known to provide portable large-capacity scales for transport from one place to another, as on a transporting vehicle such as a motor truck, and for removal from the transporting vehicle to a ground mounted position for receiving and weighing motor trucks and the like. The weighbridge platforms on such scales generally have an over-all width which is sufficient to accommodate large trucks thereon in weighing operations. The platform width for this purpose approximates ten feet, but such width is in excess of highway width limits imposed for legal highway transport, as the limit of eight feet imposed on many if not most highways. Therefore, for highway transport of the scale, the width of the weighbridge platform must be somehow reduced at least to the higway width limit. This has been accomplished generally heretofore, by providing the platform in two separate parts which are removably secured on the weighbridge in laterally extended positions thereon for truck reception in weighing operations. When it is desired to transport the scale to another point of use, the two platform parts are detached from the weighbridge and bodily lifted to retracted positions on the weighbridge, thereby reducing the width of the scale in its mounted condition on the transporting vehicle, to something less than or not in excess of the highway width limit.

The practice as indicated above, has certain disadvantages among which is that presented by the time and effort required in unfastening and lifting the platform parts to an inboard position on the scale weighbridge, and then securing them against displacement during transport. Since the platform parts are necessarily of relatively heavy construction, the lifting effort here is considerable in inboard placing of the parts.

It is an object of the present invention, therefore, to provide an improved weighbridge platform arrangement in a transportable scale, which avoids the foregoing and other disadvantages attending platform arrangements as heretofore employed.

A more specific object is to provide in the weighbridge structure of a transportable scale for weighing trucks and the like, platform means comprising a pair of truck wheel-receiving deck plates each structurally connected to the weighbridge through swingable support means arranged to permit and facilitate easily effected plate displacement to and between an extended position laterally of the weighbridge and a retracted or inboard position relative thereto.

The foregoing and other objects of the invention will appear from the following description of a presently preferred embodiment thereof as illustrated in the accompanying drawings, wherein:

FIG. 3 is a view in plan elevation of the scale illustrating deck plate mounting and showing the deck plates in extended, load-receiving positions;

FIG. 4 is a plan view of the scale similar to that of FIG. 3, but showing the deck plates in retracted positions;

FIG. 5 is an enlarged transverse section through the scale weighbridge in the region of a swing arm as here provided for deck plate connection to the weighbridge, the view being taken along line 5—5 in FIG. 3;

FIG. 6 is a side view of the weighbridge in fragmentary part opposite one swing arm, as taken from line 6—6 in FIG. 5;

FIG. 7 is a fragmentary detail view in plan at one end of one of the deck plates, illustrating a manner of releasably securing the deck plate in either its extended position shown in full lines or its retracted position shown in broken lines;

FIG. 8 is a fragmentary detail view in plan at one corner of the deck plates, illustrating a manner of releasably securing the deck plate in either its extended position shown in full lines or its retracted position shown in broken lines.

Figure 1:
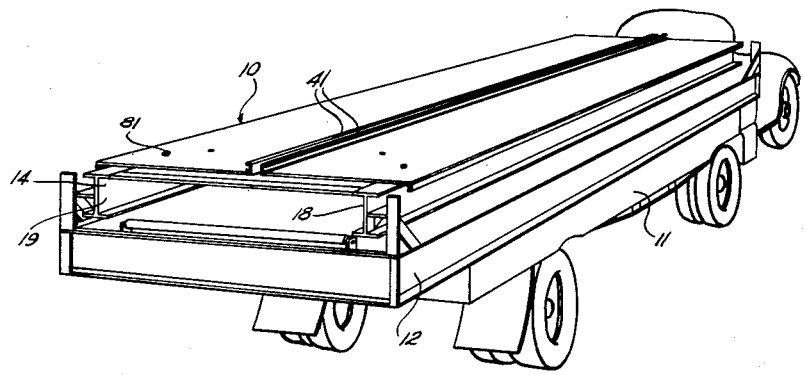
FIG. 1 is a perspective view showing a transportable scale embodying the present improvements, mounted in transporting position on a motor truck.

Referring to the drawings, a transportable motor truck scale 10 is shown in FIG. 1 is transporting position on a vehicle 11 here illustrated as a motor truck. The scale provides a base frame 12 and a weighbridge 14 in support thereon through a suspension lever system of suitable well-known character. Since the form and details of the lever system do not constitute any part of the present invention, the lever system is not herein illustrated except as to the output or transverse lever 15 as appears in FIG. 2 wherein the scale is shown in operative, ground-mounted position. In the latter view, the detachable outer end 15a of the transverse lever has connected thereto the usual rod or steelyard 16 which, in turn, is connected to weight indicator means such as a balance weighbeam, a dial unit or other indicator mechanism (not shown).

Figure 2:
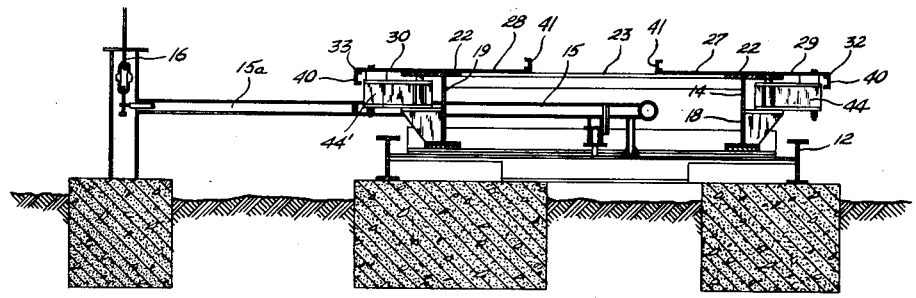
FIG. 2 is a view of the scale in ground mounted position for weighing operations, this view showing the scale in transverse section to illustrate features of the invention.

The scale weighbridge includes, as observed in FIGS. 2 and 3, opposite longitudinal side members 18 and 19 structurally joined by transverse members or ribs 20. The side members 18 and 19 are preferably relatively heavy I-beams having the upper flanges 22 in a common plane, while the transverse members 20 may be of suitable form having upper flanges 23 in the plane of the I-beam flanges 22 (FIGS. 2 and 5). Carried by the weighbridge is a platform which here comprises a pair of generally rectangular platform members or deck plates 27 and 28 each preferably being a flat steel plate approximating the length of the weighbridge. Since they afford the wheel support for a vehicle or motor truck in weighing position on the scale, each deck plate may have a checkered top surface (not here shown) to improve wheel-traction in vehicle drive onto and from the weighbridge.

The deck plate 27 is supported upon the upper flange 22 of I-beam 18 and the adjacent portions of flanges 23 of the ribs 20, and is slidable thereon to and between extended and retracted positions laterally relative to the I-beam 18. The opposite deck plate 28 which parallels the plate 27, is related in like manner to the I-beam 19 and ribs 20. These deck plates are retained in structural assembly with the weighbridge in a manner permitting location thereof selectively in predetermined retracted or extended positions, by means presently to be described. When in extended positions (FIGS. 2, 3 and 5), the plate 27 has its outer longitudinal portion 29 laterally beyond or overhanging the underlying I-beam 18, while the outer longitudinal portion 30 of plate 28 similarly overhangs its I-beam 19. The parallel outer edges 32 and 33 of the plates 27 and 28 respectively, then are spaced transversely of the weighbridge by distance which is appreciably in determined extent, than the distance between the outer sides of opposite wheels of vehicles to be received on the weighbridge for weighing operations. For large, heavy-duty motor trucks, as the scale transporting truck 11 for example, such spacing distance of the deck plates at the outer edges, will approximate ten feet.

The deck plates are provided, of course, to have a width which is ample or entirely sufficient for vehicle wheel reception in full support thereon when the deck plates are in extended positions. While ample for the purpose, the width of each deck plate is so limited as to permit retraction of the plates laterally relative to the weighbridge, to positions wherein the corresponding inner longitudinal edges 34 thereof are spaced apart as illustrated in FIG. 4, while the outer edges 32 and 33, respectively, lie relatively near the outer flange edges 36 and 37 of beams 18 and 19. The latter positioning of the plates, being the heretofore mentioned retracted positions thereof, is here predetermined such that the distance transversely of the weighbridge between the parallel outer plate edges 32 and 33, is not in excess of the maximum width limit permissible in highway transport of the scale. In view of the more common highway width limit of eight feet, the distance between the outer edges of the deck plates when in retracted positions, thus is determined to be no greater than eight feet.

Since the deck plates are here structurally connected to weighbridge in identical manner, a description of the connecting provisions in respect to the plate 27 will suffice for the plate 28, corresponding elements in the connecting means of the latter being indicated wherever they appear in the drawings, by the same reference numerals differentiated by primes.

Referring particularly to FIGS. 2, 3 and 5, the deck plate 27 is provided with a stiffening rib 40 along the under side of its outer longitudinal edge 32. A like rib 40 is provided on plate 28. Also, the plate carries a guard rail 41 upstanding along its inner longitudinal margin or edge 34 provided for cooperation with a like rail 41 upstanding along the inner edge 34 of the opposite plate 28, to retain the wheels of a vehicle from running laterally off the deck plates. The plate 27 is structurally connected to the weighbridge by a plurality of swing arm units or assemblies 44 suitably spaced along the weighbridge I-beam 18. Conveniently in the present example, the spacing of assemblies 44 is such as to have one assembly in line with each of the weighbridge transverse ribs 20. Although this spacing is not essential, since the arm units afford structural support in respect to the laterally overhanging portion of the deck plate, as will appear, it is important to employ a sufficient number of the arm units spaced over the length of the deck plate to assure adequate overhang support of the plate.

Each arm unit 44 includes a rigid arm preferably formed by upper and lower plates 46 and 47 each of elongate rectangular shape, arranged in parallel registry and rigidly joined by a two-part central web plate comprising a long web section 48 and a short web section 50 spaced from web 48 at the inner end portion 51 of the arm. The arm is located adjacently below the deck plate, and is pivotally carried by the weighbridge beam 18 in cantilever projection therefrom and such as to be freely swingable in an arcuate path parallel to the plane of the deck plate. Pivotal support of the arm is here effected by a rigid pivot element provided by a preferably hollow tubular member 52, the member extending in the space between the web sections 48 and 50 and passing through aligned openings (not shown) provided therefor in the arm plates. The pivot 52 which has the arm freely swingable thereon is supported below the arm by a bracket 55 rigidly secured to the outer side of the web 56 of beam 18 and to the bottom beam flange 58. The bracket provides a flat upper bracket plate 59 to which the lower end of the pivot 52 is swingably secured, the plate 59 affording a supporting surface engaged by the inner end portion of the lower arm plate 47 in cantilever projection of the arm from such surface and the pivot 52. Supporting the upper end of pivot 52 is a bracket plate element 63 suitably rigidly attached to the outer edge of the upper flange 22 of beam 18. The arm carries a bearing plate or pad 64 fixed on the upper arm plate 46 near the outer end 66 of the arm, provided for engagement with the under side of the deck plate in its outer portion 29. It is to be noted that the arm may have its parts secured together as by welding or in any other suitable manner, and similarly the bracket 55 and bracket plate 63 may be welded or otherwise secured to the beam 18.

Operative connection between the deck plate 27 and the arm units 44 is effected by pivotal attachment of each arm at its free end 66, to the plate in the outer or overhang region 29 of the latter. This is accomplished such as to afford a particular relationship between the arms and the deck plates, necessary to permit displacement of the deck plate to and between its hereinbefore described extended and retracted positions. Conveniently to that end, the connection may be made in the following manner.

As a first step, all of the arm units are disposed in outward projection such as that each is normal to the weighbridge beam 18. Whereupon the deck plate 27 is placed upon the weighbridge in longitudinally centered relation thereto and in its laterally extended position described heretofore. As so placed, the deck plate then overhangs the beam 18 with its outer overhang portion 29 engaging or resting upon the bearing pads 64 carried by the arms. While this relationship of the parts is maintained, each arm is pinned to the deck plate by a pivot element or bolt 70 located at the outer end 66 of the arm at one side of the arm web 48 and parallel with the arm pivot 52. Such pivot bolt connection at each arm, may be accomplished quite simply by drilling on a vertical axis parallel to the vertical axis of the tubular arm pivot 52, through the deck plate, the pad 64 and the upper arm plate 46 and continuing through the lower arm plate 47, thereby providing aligned openings to receive the bolt 70. The bolt then inserted through the openings with the bolt head 71 abutting the deck plate, is retained in place as by a nut 72 on its lower threaded end 74 and locked by a lock nut 75. The bolt retaining nut 72 is clear of clamping contact with the lower arm plate 47, so that the arm is free to turn about the axis of the bolt.

The deck plate 27 thus is connected and retained in assembly with the scale weighbridge, by the swing arms 44. When these arms are in outward projection and in positions normal to the weighbridge beam 18, the deck plate then will be in its extended position laterally relative to the weighbridge, for load reception in weighing use of the scale. As so positioned, the plate overhang portion 29 thus is under adequate structural support by the plurality of swing arms. Now, when the scale is to be transported, the deck plate must be located in its retracted position inwardly on the weighbridge. This is accomplished readily and easily here, merely by sliding (manually pushing) the deck plate over the weighbridge beam and rib flanges on which the plate rests, to its retracted position heretofore described. In this operation, the arms 44 swing about the pivot 52 inwardly toward the weighbridge beam 18, and thus constrain the deck plate to an arcuate movement in slide displacement thereof to its retracted position. It is to be here noted that the swing arm connection of the deck plate to the weighbridge is predetermined in respect to the effective length of the arms and the pivotal points thereof relative to the weighbridge and the plate, such as to attain the desired extended and retracted positions of the deck plate. As indicated in FIG. 4, in the retracted position of the deck plate the swing arms occupy positions substantially parallel to the weighbridge beam 18, so that in the present example, the swing arc of the arms between the extended and retracted positions of the deck plate, is approximately ninety degrees.

The opposite deck plate 28 is connected to the weighbridge in exactly the same manner, as by the swing arm 44'. Moreover, in order to retain the deck plates in their retracted or extended positions, holding means of any suitable or desired character may be employed either in association with the swing arms or directly between each deck plate and the weighbridge frame. In the present example, one or more readily removable bolts are employed for this purpose, in application between each deck plate and its underlying weighbridge beam. Referring to FIGS. 3 and 8, each deck plate is provided with a bolt receiving aperture 80 which in the extended position of the plate, aligns with a like aperture (not shown) in the underlying top flange 22 of the associated weighbridge beam. A bolt 81 preferably having a flat or rounded head, then is inserted through the aligned apertures and removably secured in place to retain the deck plate in extended position. Upon removing the bolts 81, the deck plates are then free to be displaced to their retracted positions. Each deck plate has a second aperture 82 so located therein as to come into alignment with the aforementioned aperture in the top flange 22 of the associated weighbridge beam, upon location of the deck plate in its retracted position (FIG. 4). The same bolt 81 then is inserted through the aligned apertures and secured in place thus retaining the deck plate in retracted position. While as to each deck plate, only one bolt 81 and one set of deck plate apertures 80—82 are shown, these may be duplicated at one or more additional points along the deck plate, if desired.

The invention as will be now understood from the foregoing description and illustration of a presently preferred embodiment thereof, thus affords an improved weighbridge deck plate arrangement in a transportable scale, which avoids the disadvantages of deck plate arrangements heretofore employed. It is to be understood, further, that while one form of the invention is here disclosed, other embodiments and variations in the form shown are contemplated within the scope of the invention as hereinafter claimed.

What is claimed is:

In a vehicle transportable weighing scale providing a weighbridge having a rigid frame including longitudinal side members, a weighbridge deck plate extending longitudinally over each side member in slidable support thereon with its outer longitudinal marginal portion overhanging the side member, and means connecting the deck plate to the side member and permitting by sliding displacement thereof on the associated side member, location of the deck plate selectively in predetermined positions of minimum and maximum overhang of its outer marginal portion relative to the side member, said means comprising a plurality of cylindrical pivot members relatively spaced along the side member, bracket means on the side member supporting each pivot member in a position having its axis normal to the plane of the deck plate, a rigid arm pivotally carried by each pivot member in cantilever extension therefrom beneath the deck plate, for movement in an arcuate path parallel to the plane of the deck plate, a bearing pad on the free end of each arm in supporting contact with the outer marginal portion of the deck plate, a pivot element pivotally connecting the free end of each arm to said outer marginal portion of the deck plate and releasable means effective between each deck plate and its associated side member for retaining the deck plate in the selected one of its predetermined positions of its outer marginal portion relative to the side member.

References Cited in the file of this patent
UNITED STATES PATENTS

| | | |
|---|---|---|
| 2,704,223 | Houdart | Mar. 15, 1955 |
| 2,869,855 | Murphy | Jan. 20, 1959 |
| 2,906,556 | Cantele et al. | Sept. 29, 1959 |